(12) United States Patent
Gorantla et al.

(10) Patent No.: US 10,438,617 B2
(45) Date of Patent: Oct. 8, 2019

(54) HEAT ASSISTED MAGNETIC DATA RECORDING HEAD WITH HEAT SINK

(71) Applicant: Western Digital Technologies, Inc., Irvine, CA (US)

(72) Inventors: Venkata R K Gorantla, Dublin, CA (US); Takuya Matsumoto, Sunnyvale, CA (US); Aron Pentek, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 309 days.

(21) Appl. No.: 15/498,326

(22) Filed: Apr. 26, 2017

(65) Prior Publication Data

US 2018/0158473 A1   Jun. 7, 2018

Related U.S. Application Data

(63) Continuation-in-part of application No. 15/369,730, filed on Dec. 5, 2016.

(51) Int. Cl.
  *G11B 5/31*    (2006.01)
  *G11B 5/40*    (2006.01)
  *G11B 5/60*    (2006.01)
  *G11B 5/127*   (2006.01)
  *G11B 5/00*    (2006.01)

(52) U.S. Cl.
  CPC .......... *G11B 5/314* (2013.01); *G11B 5/1278* (2013.01); *G11B 5/3133* (2013.01); *G11B 5/40* (2013.01); *G11B 5/6088* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 8,254,215 B1 * | 8/2012 | Tanaka et al. | G11B 5/314 369/13.33 |
| 8,339,740 B2 | 12/2012 | Zou et al. | |
| 8,456,968 B1 * | 6/2013 | Sasaki et al. | G11B 5/314 369/13.33 |
| 8,477,572 B1 | 7/2013 | Sahoo et al. | |

(Continued)

OTHER PUBLICATIONS

Non-Final Office Action issued in co-pending U.S. Appl. No. 15/369,730, dated Dec. 27, 2018 (U.S. Publication No. 2018/0158474).

(Continued)

*Primary Examiner* — Craig A. Renner
(74) *Attorney, Agent, or Firm* — Foley & Lardner LLP

(57) ABSTRACT

A magnetic write head for heat assisted magnetic recording having a novel heat sink structure. The write head includes a magnetic write pole and a thermal transducer located adjacent to a leading edge of the magnetic write pole. A heat sink structure, constructed of a non-magnetic, thermally conductive material such as Au, Ag or Cu partially surrounds the magnetic write pole. The heat sink structure can be formed to contact first and second sides of the magnetic write pole, and can be recessed from the media facing surface of the write head. The space between the heat sink structure and the media facing surface can be filled with a physically hard, non-corrosive metal.

29 Claims, 23 Drawing Sheets

(56) References Cited

U.S. PATENT DOCUMENTS

| | | | |
|---|---|---|---|
| 8,488,419 B1 * | 7/2013 | Jin et al. | G11B 5/314 360/59 |
| 8,721,902 B1 | 5/2014 | Wang et al. | |
| 8,923,100 B1 * | 12/2014 | Wessel et al. | G11B 5/6088 369/13.33 |
| 8,947,986 B1 * | 2/2015 | Araki et al. | G11B 5/314 369/13.33 |
| 8,995,088 B1 | 3/2015 | Boone et al. | |
| 9,064,515 B2 | 6/2015 | Zhao et al. | |
| 9,135,930 B1 | 9/2015 | Zeng et al. | |
| 9,202,479 B1 | 12/2015 | Wessel et al. | |
| 9,218,835 B1 * | 12/2015 | Sasaki et al. | G11B 5/314 |
| 9,230,572 B2 | 1/2016 | Balamane et al. | |
| 9,478,241 B1 * | 10/2016 | Tanemura et al. | G11B 5/314 |
| 9,659,588 B2 * | 5/2017 | Sasaki et al. | G11B 5/314 |
| 9,761,253 B1 * | 9/2017 | Sasaki et al. | G11B 5/314 |
| 2002/0132137 A1 | 9/2002 | Kawasaki et al. | |
| 2008/0232000 A1 | 9/2008 | Flint et al. | |
| 2009/0109570 A1 * | 4/2009 | Scholz et al. | G11B 5/1278 360/129 |
| 2009/0283205 A1 | 11/2009 | Miyazawa et al. | |
| 2010/0214685 A1 * | 8/2010 | Seigler et al. | G11B 5/314 360/59 |
| 2010/0321835 A1 | 12/2010 | Zhang et al. | |
| 2011/0011744 A1 | 1/2011 | Chen et al. | |
| 2011/0042349 A1 | 2/2011 | Zhou et al. | |
| 2013/0019467 A1 | 1/2013 | Zhang et al. | |
| 2013/0182545 A1 * | 7/2013 | Sahoo et al. | G11B 5/314 369/13.33 |
| 2014/0355400 A1 * | 12/2014 | Balamane et al. | G11B 5/314 369/13.17 |
| 2015/0036470 A1 * | 2/2015 | Balamane et al. | G11B 5/314 369/13.33 |
| 2015/0043316 A1 * | 2/2015 | Rea et al. | G11B 5/314 369/13.33 |
| 2015/0092525 A1 | 4/2015 | Araki et al. | |
| 2015/0279399 A1 * | 10/2015 | Chen et al. | G11B 5/6088 369/13.32 |
| 2016/0210994 A1 * | 7/2016 | Sasaki et al. | G11B 5/6088 |
| 2016/0343391 A1 * | 11/2016 | Sasaki et al. | G11B 5/314 |
| 2018/0096702 A1 * | 4/2018 | Staffaroni et al. | G11B 5/3133 |
| 2018/0158474 A1 | 6/2018 | Pentek et al. | |

OTHER PUBLICATIONS

Bhargava et al., "Lowering HAMR Near-Field Transducer Temperature via Inverse Electromagnetic Design," IEEE Transactions on Magnetics 51(4): 1-7 (Apr. 2015).

* cited by examiner

HEAT ASSISTED MAGNETIC DATA RECORDING HEAD WITH HEAT SINK

RELATED APPLICATIONS

The present application is a Continuation In Part application of commonly assigned U.S. patent application Ser. No. 15/369,730, filed Dec. 5, 2016, entitled, HEAT ASSISTED MAGNETIC DATA RECORDING HEAD WITH HEAT SINK.

FIELD OF THE INVENTION

The present invention relates to magnetic data recording, and more specifically to a heat assisted magnetic recording head with a heat sink structure adjacent to a magnetic write pole.

BACKGROUND

Modern day information is commonly stored in magnetic disk drives that include a rotating magnetic disk and a slider containing one or more magnetic head assemblies that house read and write heads that are suspended over the disk by a swinging suspension arm. When the disk rotates, air flows underneath the slider and causes it to lift off and 'fly' over the surface of the rotating disk, allowing for the magnetic heads to be employed via processing circuitry to read and write magnetic impressions to and from the rotating disk.

The write head includes at least one coil, a write pole, and one or more return poles. When current flows through the coil, it induces a magnetic field that emanates from the write pole into the disk. The magnetic field is sufficiently strong that it locally magnetizes a portion of the magnetic media, thus allowing for data bits to be recorded onto the disk. After passing through the magnetic layer, the magnetic field travels through the rest of the disk and completes its path by returning to the return pole of the write head.

Once a data bit is recorded onto the disk, its magnetic state can be read with a magnetoresistive sensor, such as giant magnetoresistive (GMR) or a tunnel junction magnetoresistive (TMR) sensor that has a measurable electrical resistance that changes in response to the magnetic field state of the recorded data bit.

This read/write method is the recording technique typically implemented in conventional perpendicular magnetic recording (PMR). However, as data density needs increase and data bits are made smaller and packed closer together, they become thermally unstable and prone to demagnetization. One way to circumvent this problem is to make the recording media more magnetically stiff, i.e., have a higher magnetic anisotropy. However, 'stiffer' media also require higher recording magnetic fields, something which is in itself a limitation since in order to record smaller data bits, the write pole size also needs to be reduced, and this in turn reduces the strength of the magnetic field that can be delivered to the disk.

A solution to this challenge is to use heat assisted magnetic recording (HAMR) in which data bits are defined by locally heating the media through the use of a near field thermal transducer (NFT) just at the location on the disk that is to be recorded. The heating process temporarily lowers the magnetic anisotropy of the media, thus 'softening' it and allowing it to be recorded with the write pole at write fields that would otherwise be too weak to induce magnetization. Then, after the data has been written, as the disk spins past the NFT, the media cools, causing the anisotropy of the media to rise again, thereby ensuring that the media 'freezes in' the magnetic state of the recorded data bit.

SUMMARY

One embodiment of the present invention provides a magnetic recording head for heat assisted magnetic recording. The magnetic recording head includes a magnetic write pole that extends to a media facing surface, the magnetic write pole having first and second laterally opposed sides. The magnetic recording head also includes a heat sink structure comprising a non-magnetic, thermally conductive material formed adjacent to each of the first and second laterally opposed sides of the magnetic write pole.

The heat sink structure can be formed of a material such as Au, Ag or Cu, and can be formed to contact each of the first and second sides of the magnetic write pole. The heat sink structure can be formed such that it is recessed from the media facing surface to avoid corrosion and diamond particle embedment and can be formed with a centrally disposed portion that is recessed from the media facing surface and with outer portions that taper further away from the media facing surface as they extend laterally outward from the centrally disposed portion.

The magnetic recording head can also include a thermal transducer with a plasmonic antenna located at the media facing surface and located adjacent to a leading edge of the write pole and a waveguide extending through the recording head. A non-metallic spacer can be included between the waveguide and the heat sink structure to prevent the heat sink structure from interfering with light propagation through the waveguide. The non-metallic spacer can be recessed from the media facing surface by a distance greater than the centrally disposed portion of the heat sink structure.

One embodiment of the present invention provides a method for manufacturing a magnetic write head having a heat sink structure. The method includes forming a magnetic write pole over a substrate, the write pole having first and second sides. A non-magnetic fill material is deposited, and a chemical mechanical polishing process is performed. After performing the chemical mechanical polishing, a non-magnetic heat sink structure is formed so as to extend from the sides of the magnetic write pole.

The process advantageously forms a magnetic write pole and heat sink structure in a magnetic write head that is free of voids at the media facing surface. This advantage can be realized by planarizing the write pole structure by chemical mechanical polishing prior to defining the heat sink structure. This allows the heat sink structure to be formed over a lower topography than would be the case over the as-deposited write pole, thereby minimizing shadowing effects from the write pole structure.

These and other features and advantages of the invention will become apparent upon reading of the following detailed description of the embodiments taken in conjunction with the figures in which consistent reference numbering is used to indicate similar elements throughout.

BRIEF DESCRIPTION OF THE DRAWINGS

For a fuller understanding of the nature and advantages of this invention, as well as to illustrate the preferred mode of use, reference should be made to the following detailed description, read in conjunction with the accompanying drawings, which for clarity are not drawn to scale.

DETAILED DESCRIPTION

The following description is of the best embodiments presently contemplated for carrying out this invention. This description is made for the purpose of illustrating the general principles of this invention and is not meant to limit the inventive concepts claimed herein.

Figure 1:
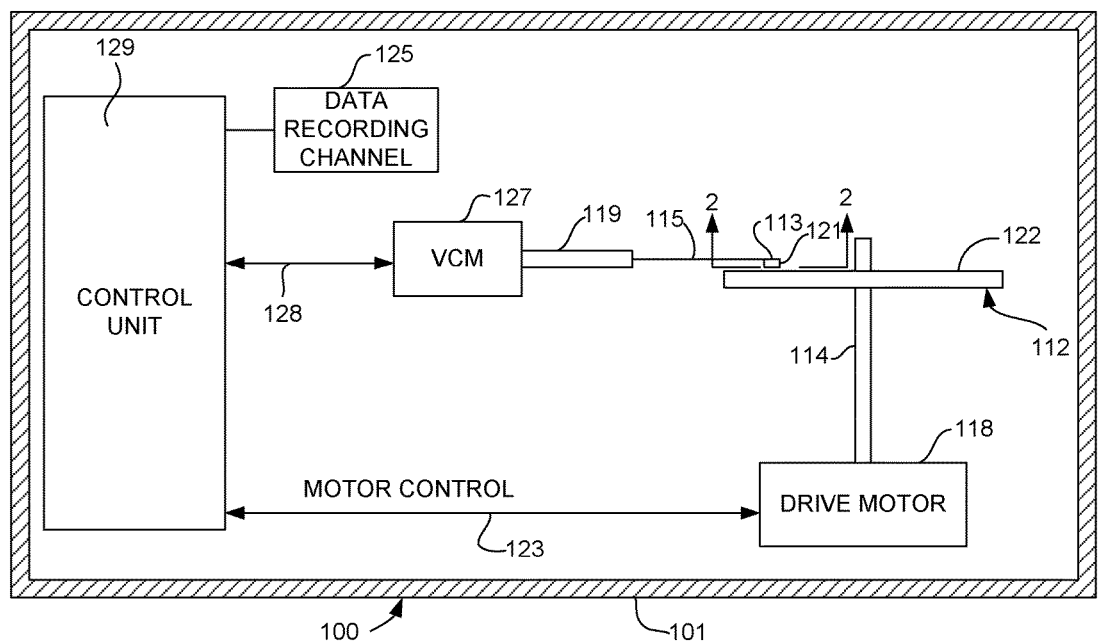
FIG. 1 is a schematic illustration of a disk drive system in which various embodiments of the invention might be embodied.

FIG. 1 shows a disk drive/disk storage system 100 along with its housing 101 containing at least one rotatable magnetic disk 112 that is supported on a spindle 114 and rotated by a disk drive motor 118. The magnetic recording pattern on each disk 112 may be in the form of annular patterns of concentric data tracks (not shown).

At least one slider 113 is positioned near the magnetic disk 112, with each slider 113 supporting one or more magnetic head assemblies 121. As the magnetic disk rotates, the slider 113 moves in and out over the disk surface 122 so that the head assembly 121 can access different tracks on the disk. Each slider 113 is attached to an actuator arm 119 by way of a suspension 115. The suspension 115 provides a slight spring force, which biases the slider 113 against the disk surface 122. Each actuator arm 119 is attached to an actuator means 127, which may be a voice coil motor (VCM) comprised of a coil that is movable according to a magnetic field. The direction and speed of the coil movement is controlled by the motor current signals supplied by the control unit 129.

During operation of the disk storage system, the rotation of the magnetic disk 112 generates an air bearing between the slider 113 and the disk surface 122, which exerts an upward force, or lift, on the slider. The air bearing thus counter-balances the slight spring force of the suspension 115 and supports the slider 113 off and slightly above the disk surface by a small, substantially constant spacing during normal operation conditions.

The various components of the disk storage system are controlled by access control and internal clock signals that are generated by a control unit 129, typically comprised of logic control circuits and a microprocessor. An aspect of the control unit 129 will be discussed below in greater detail with reference to FIG. 3. The control unit 129 generates control signals to control various system operations such as drive motor control signals on line 123 and head position and seek control signals on line 128. The control signals on line 128 move and position the slider 113 to the desired data track on the media 112. Write and read signals are communicated to and from the write and read heads 121 by way of a recording channel 125.

Figure 2:
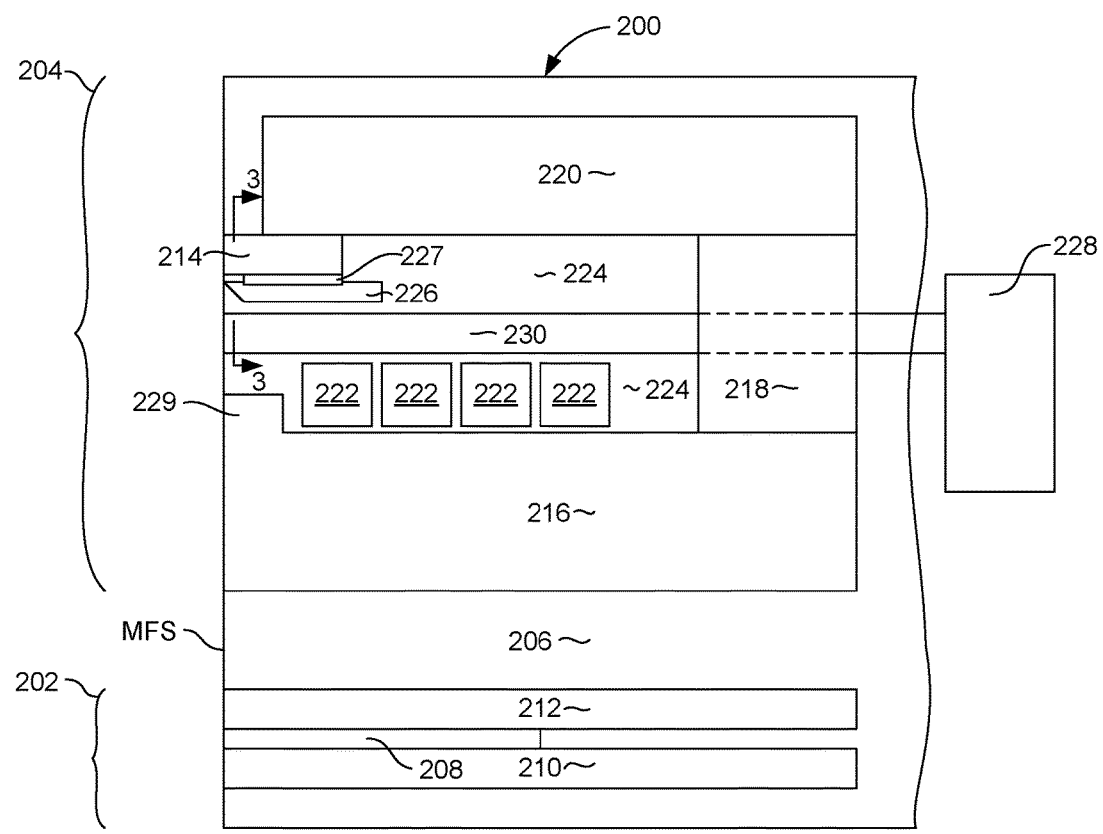
FIG. 2 is a side cross-sectional view of a magnetic read/write head for use in a magnetic data recording system.

FIG. 2 shows a cross sectional side view of a sample magnetic read/write head 200 that incorporates a near field transducer for use in heat assisted magnetic recording. The orientation of FIG. 2 is from line 2-2 of FIG. 1. The read/write head 200 includes a magnetic read element 202 and a magnetic write element 204, both of which can be embedded in an insulating fill material 206 such as alumina. The read element includes a magnetoresistive sensor 208 that can be placed in between first and second magnetic shields 210, 212.

The write element 204 includes a magnetic write pole 214, and a magnetic return pole 216, both of which extend to the media facing surface (MFS) of the head. The return pole 216 can be formed with a pedestal 229 at its end near the media facing surface MFS, the pedestal being formed to extend toward the write pole 214. The write pole 214 is connected to a main pole structure 220 that connects to the return pole 216 via a back gap structure 218.

An electrically conductive, non-magnetic write coil 222, shown in cross section in FIG. 2, passes through the write element 204. The write coil 222 can be constructed of a material such as Cu. The write coil 222 can be embedded in a non-magnetic, electrically insulating layer 224 such as alumina. When an electrical current passes through the write coil 222, a magnetic field is generated that is delivered to the disk via the write pole 214. In conventional perpendicular magnetic recording (PMR), this magnetic field is strong enough to magnetize the media, thus allowing recording to occur. The magnetic field then flows through the rest of the disk, and completes its path by returning to the return pole 216. Because the return pole 216 has a much larger area at the media facing surface MFS than does the write pole 214, the returning magnetic field strength is sufficiently weak that it does not erase any previously recorded data on the disk.

However, as data density needs increase, the size of the write pole is decreased and data bits are made smaller and packed closer together until they become thermally unstable and prone to demagnetization. One way to circumvent this problem is to construct the magnetic media of a higher anisotropy magnetic material. However, while this makes the magnetic media more stable, it also causes it to require stronger recording magnetic write fields, a problem that is exacerbated by the fact that smaller write poles output a weaker magnetic field, thus making it difficult for recording to occur.

This challenge can be overcome by the use of heat assisted magnetic recording (HAMR) in which highly anisotropic magnetic media is locally heated to temporarily lower its anisotropy, thus allowing for magnetic recording to occur. Then, as the disk moves past the hotspot, the media cools, and its anisotropy again increases, thus ensuring the magnetic stability of the recorded data on the disk.

To this end, the magnetic write element 204 can include a near field transducer (NFT) 226 that extends to the media facing surface (MFS) at a location adjacent to the leading edge of the write pole 214. The near field transducer 226 is optically connected with a light source, such as a laser 228 that can be located at the backside of the slider on which the magnetic head 200 is formed. The light from the laser 228 can be delivered to the near field transducer via the use of an optical waveguide element 230. A thermal shunt 227 may also be provided. The thermal shunt 227, which will be described in greater detail herein below, can be constructed of a thermally conductive material and can be located just above the near field transducer 226, between the near field transducer 226 and the write pole 214.

Figure 3:
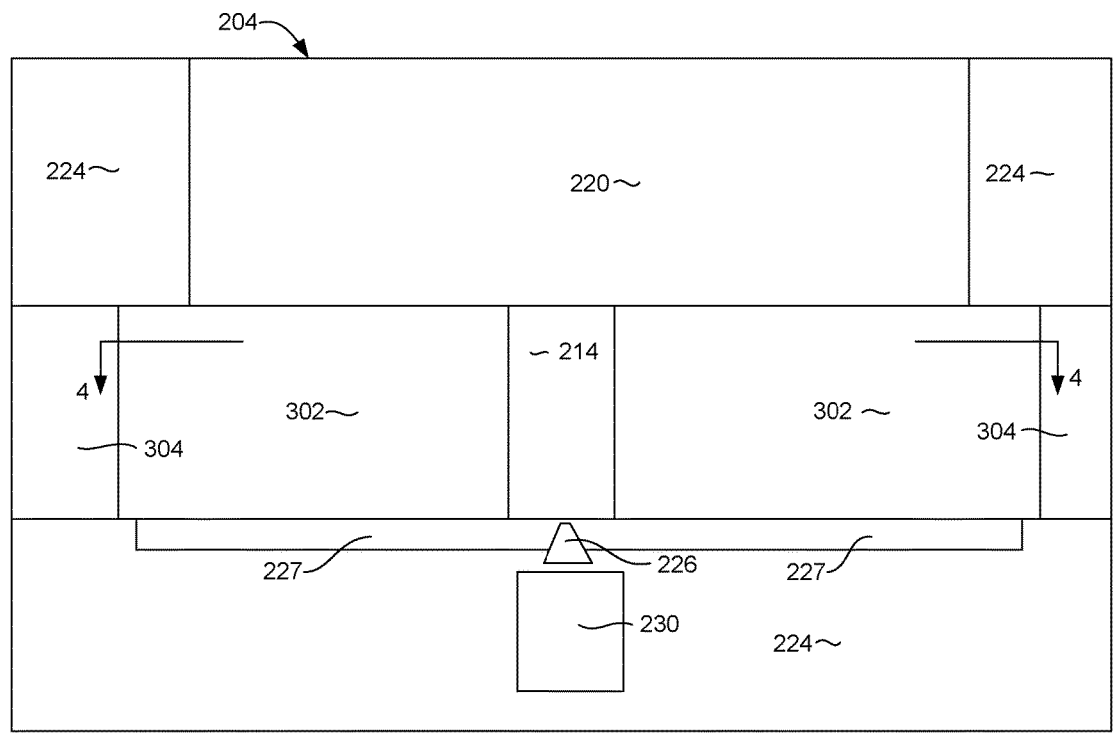
FIG. 3 is an enlarged view of a portion of a magnetic write head as seen from the media facing surface according to one embodiment.

FIG. 3 shows an enlarged view of the magnetic write pole 214 and surrounding structure from a plane parallel with the media facing surface (MFS) as taken from line 3-3 of FIG. 2, in accordance with one embodiment. As can be seen in FIG. 3, the near field transducer (NFT) 226 can be located near a leading edge of the write pole 214. The near field transducer 226 can separated from the write pole 214 by a gap that can be, for example 10 nm to 30 nm.

The near field transducer 226 generates an optical near-field in the vicinity of the apex of the near field transducer antenna 226, and this optical near-field heats the recording disk for recording. At the same time, the temperature of the near field transducer 226 increases due to light absorption by the near field transducer 226. The temperature rise at the near field transducer causes deformation of the near field transducer 226, which degrades recording performance. To reduce the near field transducer temperature, a heat sink structure 302 is provided. The heat sink structure 302 is formed around the main magnetic pole 214. The thermal shunt 227 is formed between the near field transducer 226 and the heat sink structure 302. Heat generated at the near field transducer 226 flows to the heat sink structure 302 through the thermal shunt 227. To facilitate this heat flow, the thermal shunt can be constructed of a thermally conductive material such as Au, Ag or Cu.

In addition to deformation of the near field transducer 226, the heating from the near field transducer 226 can also lead to heating of the write pole 214. This heating can result in crystallographic changes in the write pole and also can result in oxidation of the write pole 214, leading to degraded magnetic performance. This heating of the write pole 214 can be mitigated by the presence of the heat sink structure 302. The heat sink structure 302 can be formed at either side of the write pole 214 and can be formed to contact the sides of the write pole 214.

In one embodiment, the heat sink structure 302 is formed of a non-magnetic material having a high thermal conductivity such as Cu, Ag or Au. In one embodiment, the area beyond the heat sink structure 302 is filled with a non-magnetic fill material 304 such as alumina ($Al_2O_3$).

Figure 4:
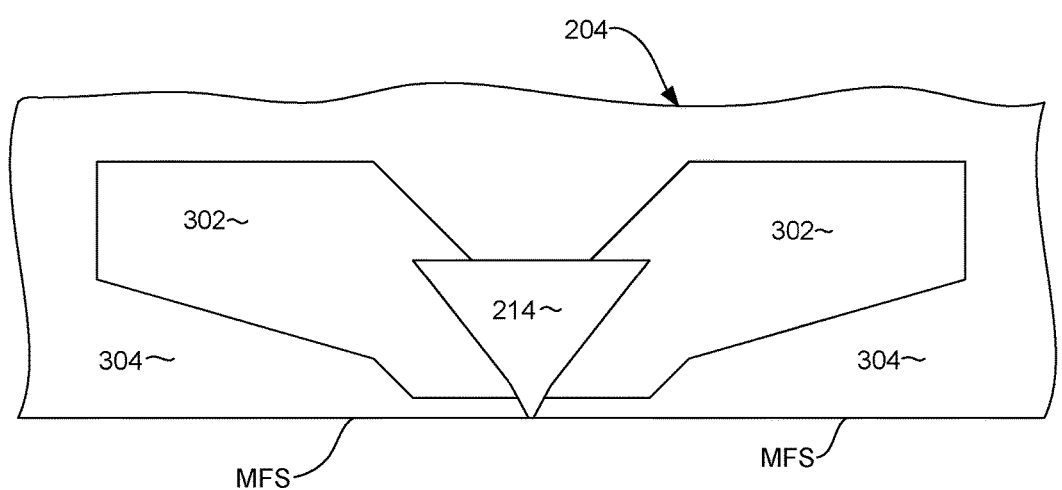
FIG. 4 is a top-down view of the write head as seen from line 4-4 of FIG. 3.

FIG. 4 shows a top down view of the write pole 214 and heat sink structure 302 as seen from line 4-4 of FIG. 3. As can be seen in FIG. 4, in one embodiment the heat sink structure 302 is recessed from the media facing surface MFS, and can even extend behind the write pole 214 in a direction away from the media facing surface MFS. Recessing the heat sink structure 302 from the media facing surface MFS prevents the heat sink structure 302 from being exposed at the media facing surface MFS, which could cause corrosion problems or wear problems. A physically hard, non corrosive fill material 304 such as alumina ($Al_2O_3$) or a hard, non-corrosive metal can be located between the heat sink structure 302 and the media facing surface MFS. In this way, the harder, more corrosion resistant fill material 304 rather than the heat sink structure 302, can be exposed at the MFS.

One challenge that can arise from the construction of the heat sink structure 302, is that of voids being formed in the fill layer 304 at the MFS. This formation of voids can lead to corrosion and wear problems and can seriously shorten the life of the write head 204. The inventors have found that these voids are the result of forming the heat shield over a tall, non-planarized write pole structure 214 after defining the write pole. If the fill layer is deposited over these tall write pole and heat shield structures, shadowing from these structures causes problematic void formation in the fill layer 304 at the media facing surface. A process described herein below can, however, advantageously form the desired heat sink structure 302 while completely avoiding problematic void formation in the fill material 304.

Figure 5:
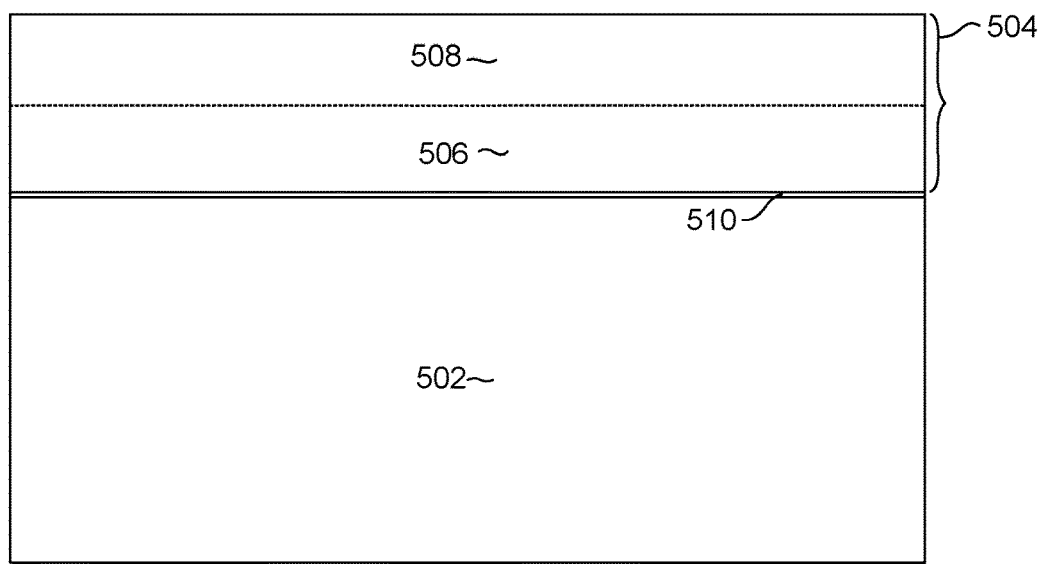
FIGS. 5-17 are views of a portion of a magnetic write head in various intermediate stages of manufacture illustrating a method of manufacturing a magnetic write head, according to various embodiments.

FIGS. 5-17 show a portion of a magnetic write head in various intermediate stages of manufacture in order to illustrate a method of manufacturing a void free magnetic write head structure with a heat sink structure, in accordance with various embodiments. With particular reference to FIG. 5, a substrate 502 is formed. This substrate 502 can be a material such as alumina ($Al_2O_3$ that has been planarized to have a smooth planar surface. A magnetic write pole material 504 is deposited over the substrate 502. The magnetic write pole material can be a bi-layer structure including first and second magnetic layers 506, 508. In addition, a seed layer 510 can be formed beneath the write pole material 504. The seed layer can be an electrically conductive magnetic material such as NiFe.

Figure 6:
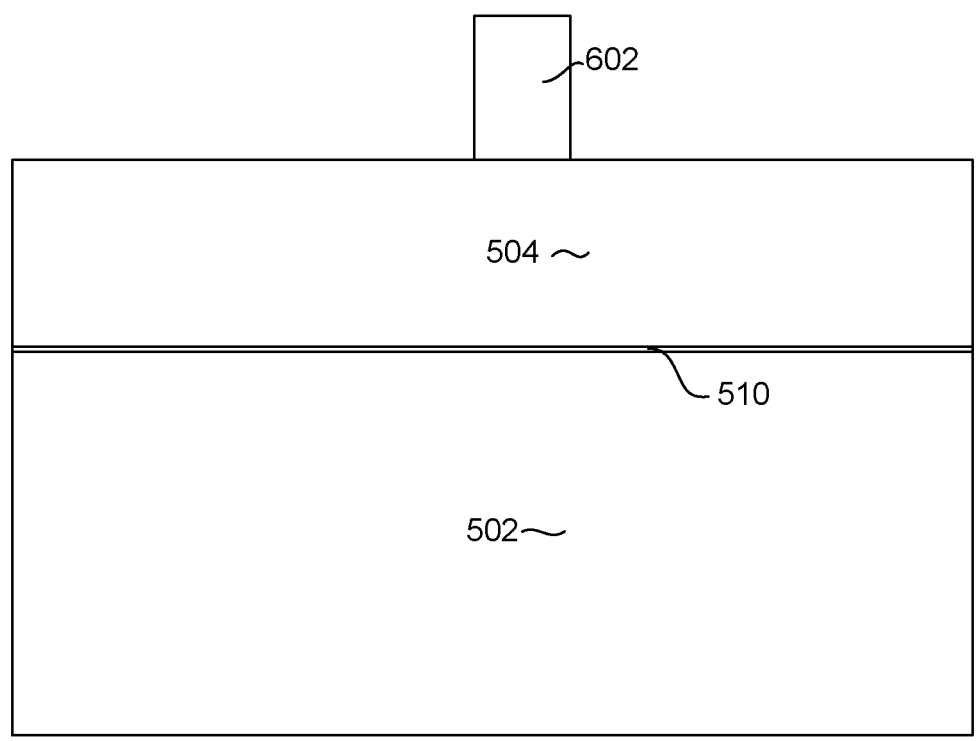

With reference to FIG. 6, a mask structure 602 can be formed over the magnetic write pole material 504. The mask 602 is configured in the shape of the desired write pole (such as shown in FIG. 4). Although FIG. 5 shows the write pole as being a bi-layer, subsequent figures will simply show the write pole material as a single layer 504 for purposes of simplicity. Optionally, the mask 602 can include a hard mask layer Cr and/or NiCr (not shown) formed beneath a patterned layer of photoresist. In that case, the hard mask would be deposited full film and then the photoresist layer would be patterned over the hard mask. The pattern of the photoresist mask would then be transferred to the underlying hard mask by ion milling, and the photoresist would be removed, leaving the patterned hard mask.

Figure 7:
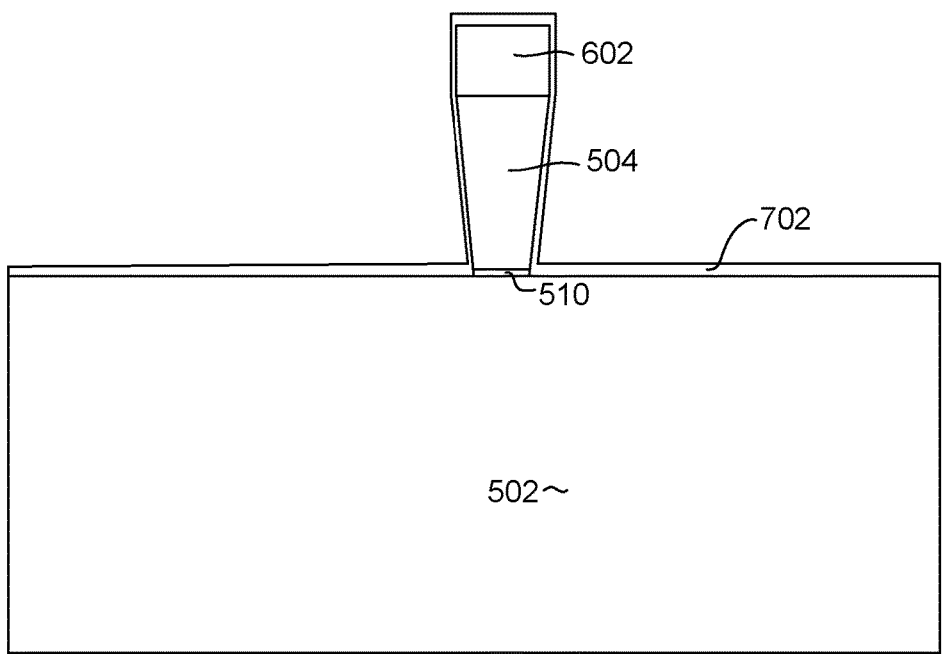

Then, an ion milling process can be performed to remove material not protected by the mask 602 so as to leave a write pole structure 504 as shown in FIG. 7. In addition to the write pole material 504, the seed layer 510 can also be removed by ion milling. If a hard mask (not shown) is used, that could be removed by ion milling. It should be pointed out, that this is only one possible method for forming the write pole 504. Other methods are possible as well, such as forming an electroplating mask with an opening configured to define the write pole shape 504 and then electroplating the write pole 504. Also, a damascene process could be employed wherein a magnetic material is electroplated into a trench formed in a substrate. After the write pole 504 has been defined, an etch stop layer 702 can be deposited. The etch stop layer 702 can be one or more materials such as Cr, Ru, NiCr or combinations of thereof. The thickness of the etch stop layer is preferably optimized to minimize the thickness of the etch stop layer 702 on the sides of the write pole 504 so as to provide optimal thermal conduction to the heat sink structure, as will be seen. Because of shadowing effects from the write pole structure 504, the thickness of the etch stop layer at the sides and bottom of the write pole 504 will be less than that over the substrate 502. Preferably, the etch stop layer 702 will be deposited to a nominal thickness of about 60 nm, which will result the etch stop layer 702 having a thickness of about 20 nm at the sides of the write pole 504.

Figure 8:
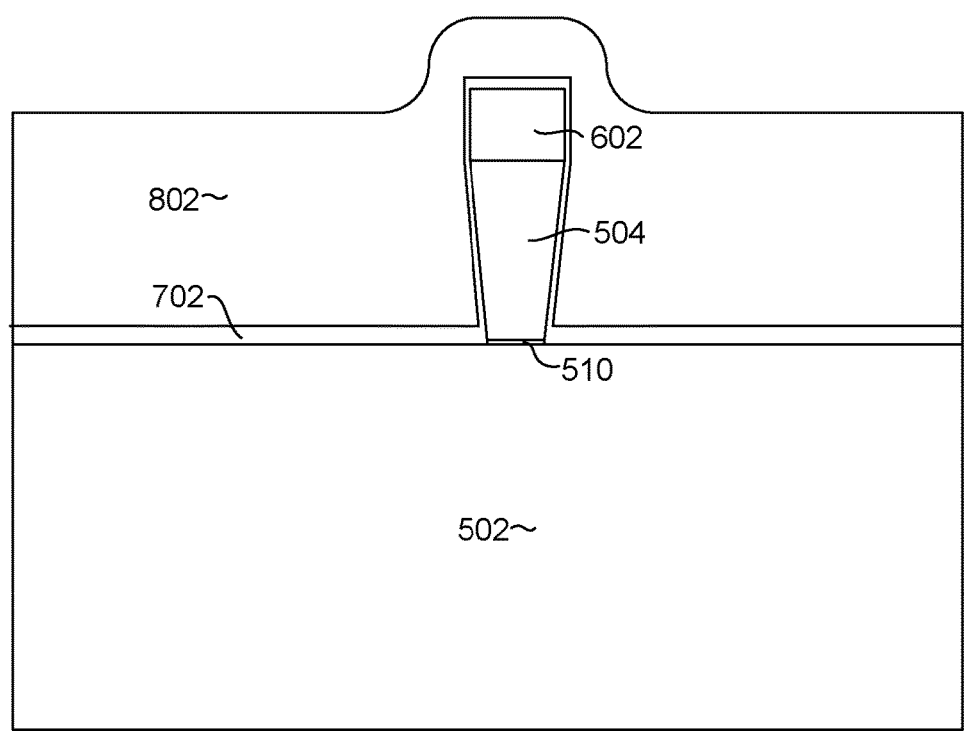
Figure 9:
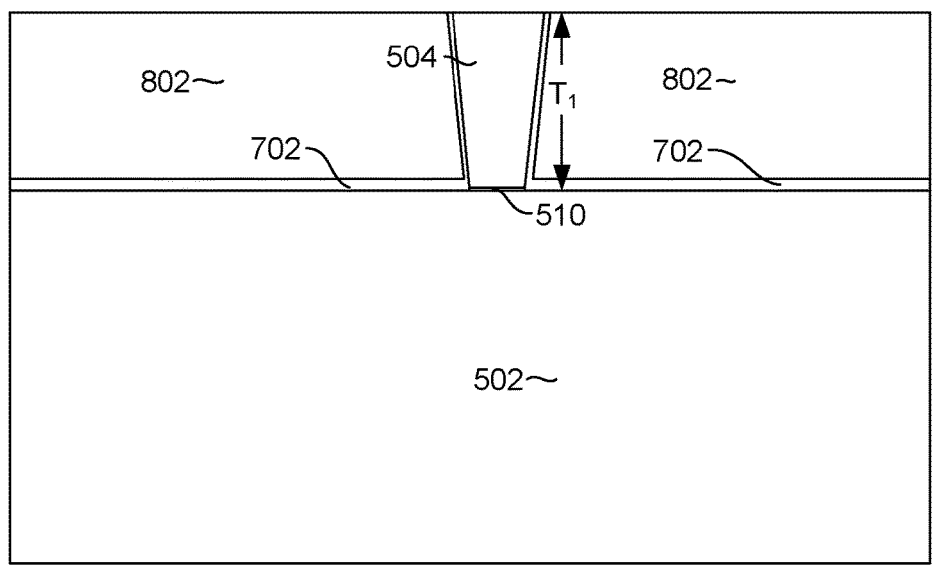

With reference now to FIG. 8, a fill material 802 is deposited. The fill material 802 is preferably alumina ($Al_2O_3$) and is deposited sufficiently thick to cover the write pole 504 and remaining mask 602. Then, a chemical mechanical polishing is performed. The chemical mechanical polishing (CMP) is performed sufficiently to remove any remaining mask material 602, exposing the write pole 504 and leaving a structure as shown in FIG. 9 with a planar upper surface. In one embodiment, this chemical mechanical polishing removes a portion of the write pole material leaving the write pole with a thickness $T_1$ in the vertical direction, but does not remove a sufficient amount to define a desired finished height of the write pole 504. This intermediate thickness $T_1$ can be 1.2 to 1.6 um. As will be seen, a later chemical mechanical polishing will further remove write pole material 504 to define the final write pole thickness (in the vertical direction).

Figure 10:
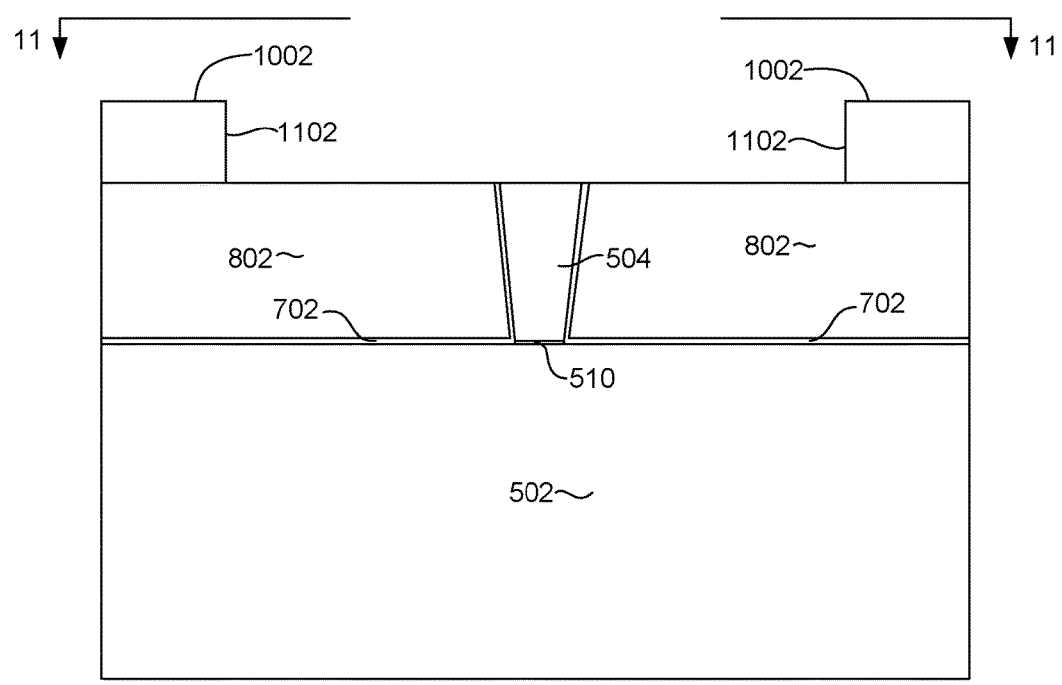
Figure 11:
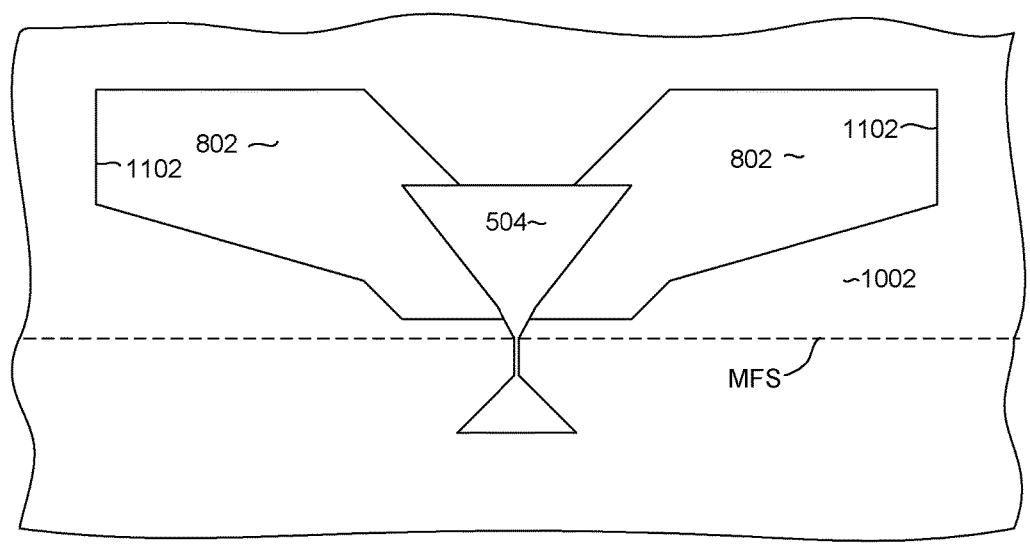

With reference now to FIGS. 10 and 11, a mask structure 1002 is formed over the write pole 504 and fill layer 802. FIG. 11 shows a top down view as seen from line 11-11 of FIG. 10. This mask can include a hard mask layer (not shown) such as Cr and/or NiCr. The hard mask would be deposited full film and a photoresist mask could be patterned over the hard mask. The pattern of the photoresist mask would then be transferred to the hard mask by ion milling and the photoresist mask could then be removed, leaving only the hard mask. The mask 1002 is has an opening 1102 that is configured to define the shape of a heat sink structure, such as the heat sink structure 302 shown in FIG. 4.

Figure 12:
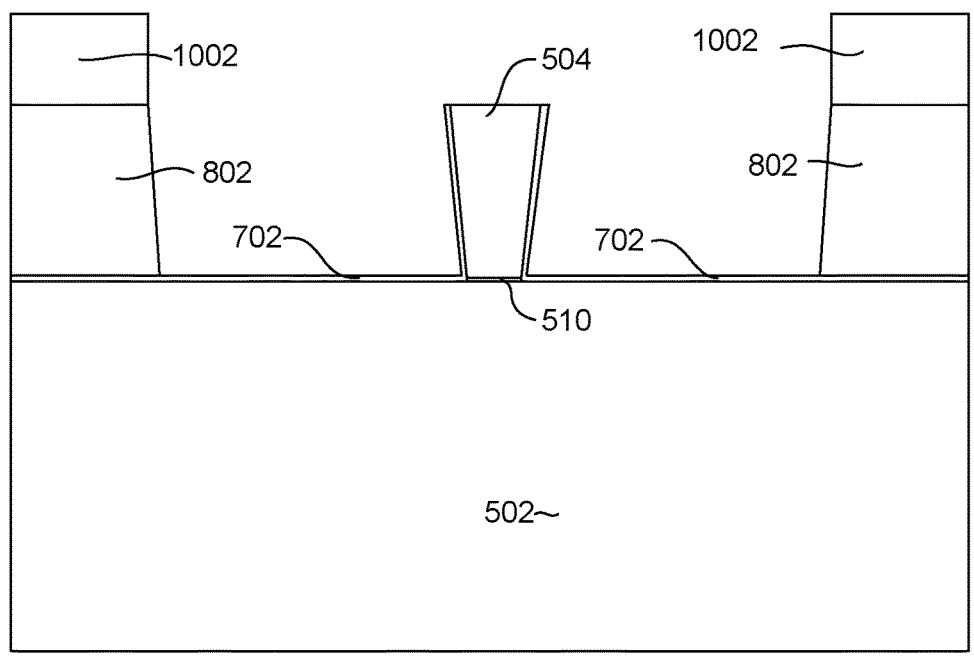
Figure 13:
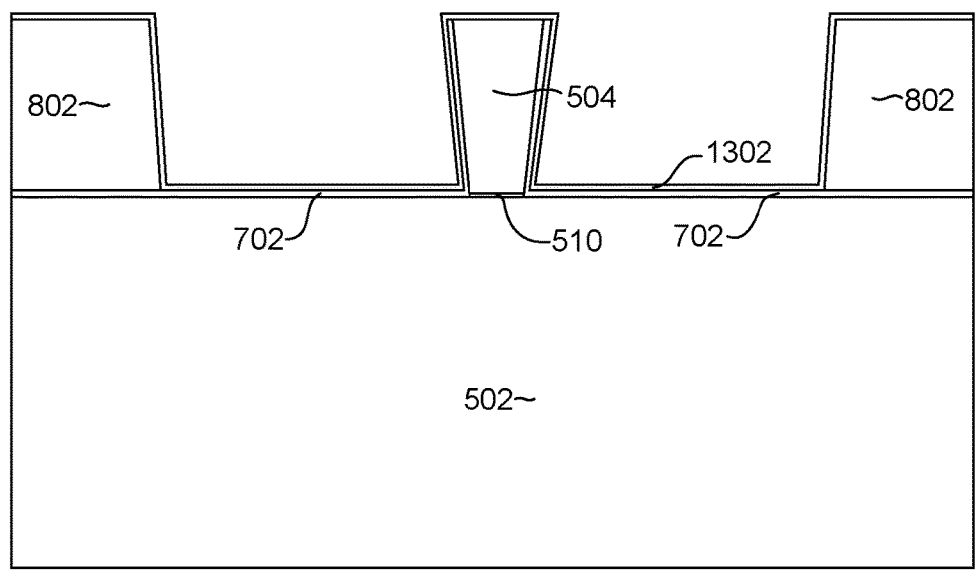

With reference to FIG. 12, a reactive ion etching is performed to remove portions of the fill layer 802 that are not protected by the mask 1002, forming a trench in the fill layer having the shape of the desired heat sink structure. The etching can be performed until the etch stop layer 702 is reached. If a hard mask (not shown) is used, this can be removed by ion milling. Then, with reference to FIG. 13, an electroplating seed layer 1302 is deposited, as performed in accordance with one embodiment. The electroplating seed layer 1302 is an electrically conductive material that can be deposited by a process such as sputter deposition. Preferably, the electroplating seed layer 1302 is a bi-layer of Cr and Au. The Cr layer can have a thickness of about 5 nm and the Au can have a thickness of about 25 nm.

Figure 14:
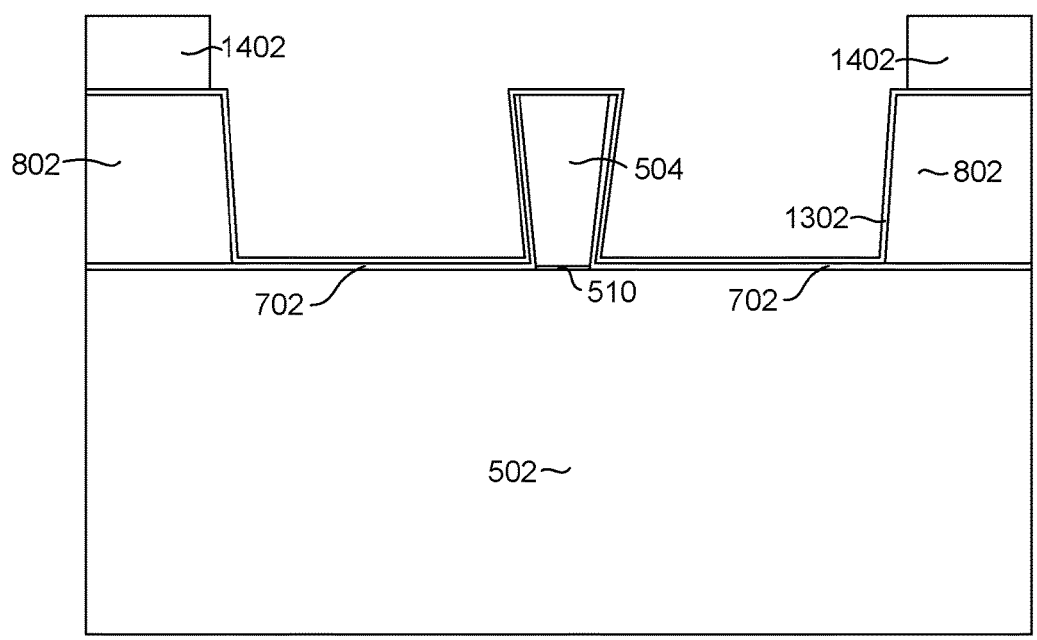

With reference now to FIG. 14, another mask structure 1402 is formed in accordance with one embodiment. The mask 1402 is an electroplating mask that has an opening that is just slightly larger than the trench formed by the previously described masking and etching process. This slightly larger size of the openings allows for misalignment of variation in the mask patterning, ensuring that the entire trench will be exposed by the opening in the mask 1402. The mask 1402 can be constructed of photoresist and can be about 4.0 um thick. Again, this mask 1402 can include a hard mask such as Cr and/or NiCr (not shown).

Figure 15:
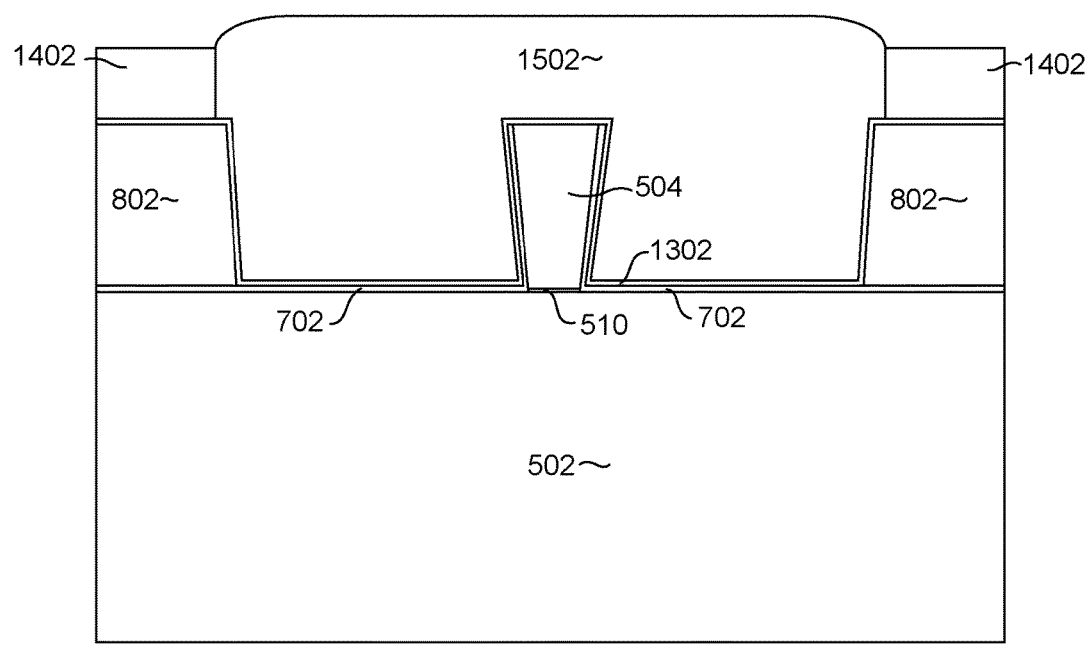
Figure 16:
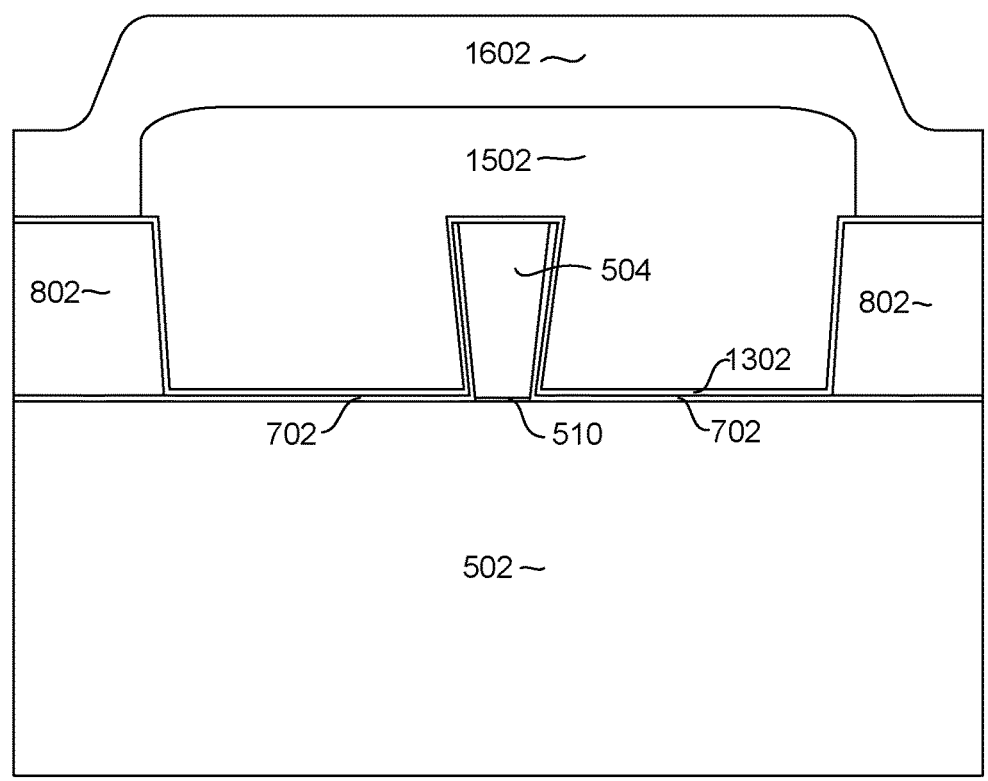

Then, with reference to FIG. 15, a heat sink material 1502 having a high thermal conductivity is electroplated into the opening in the mask 1402 and into the trench. The heat sink material 1502 is preferably Cu and is preferably electroplated to a thickness of about 1.8 um. After the heat sink material 1502 has been electroplated, the mask 1402 can be removed and another layer of fill material 1602 can be deposited, leaving as structure as shown in FIG. 16. The fill layer deposition is preferably an alumina deposition, which can be deposited to a thickness of about 1.5 um.

Figure 17:
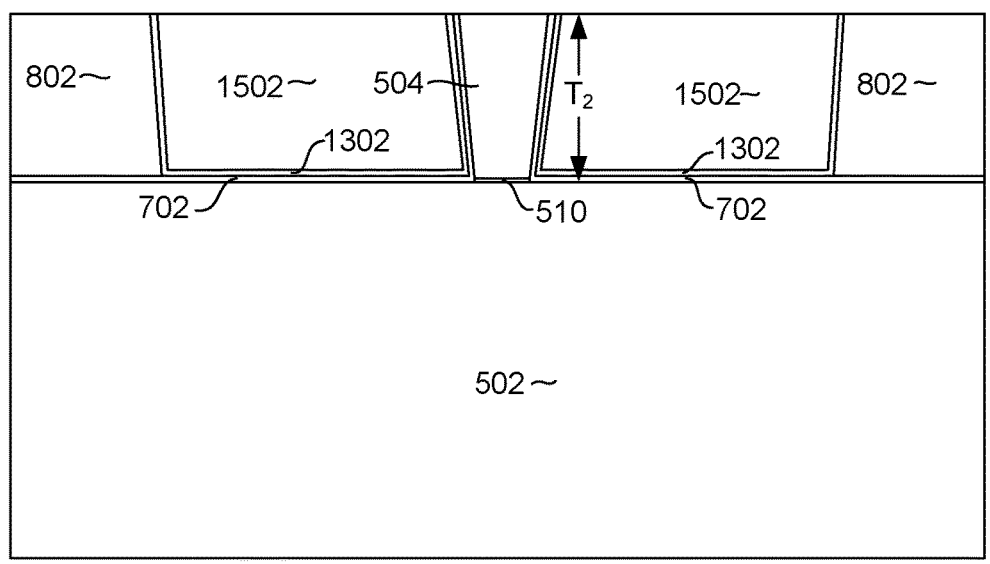

Another chemical mechanical polishing can then be performed, leaving a structure as shown in FIG. 17. The chemical mechanical polishing is performed sufficiently to expose the write pole 504. This chemical mechanical polishing is performed sufficiently to achieve a final desired thickness $T_2$ of the write pole 504 (in the vertical direction in FIG. 17). Preferably, this chemical mechanical polishing is performed to achieve a write pole having a thickness $T_2$ of 0.9 to 1.3 um.

The above described process forms a heat sink structure without forming voids at the media facing surface (MFS). Because the write pole is planarized by chemical mechanical polishing before plating of the heat sink structure, the heat sink structure does not have to be formed over the tall topography of the as plated write pole. Also, depositing the final fill layer over the previously planarized heat sink structure further prevents the formation of voids in the fill material at the media facing surface.

Figure 18:
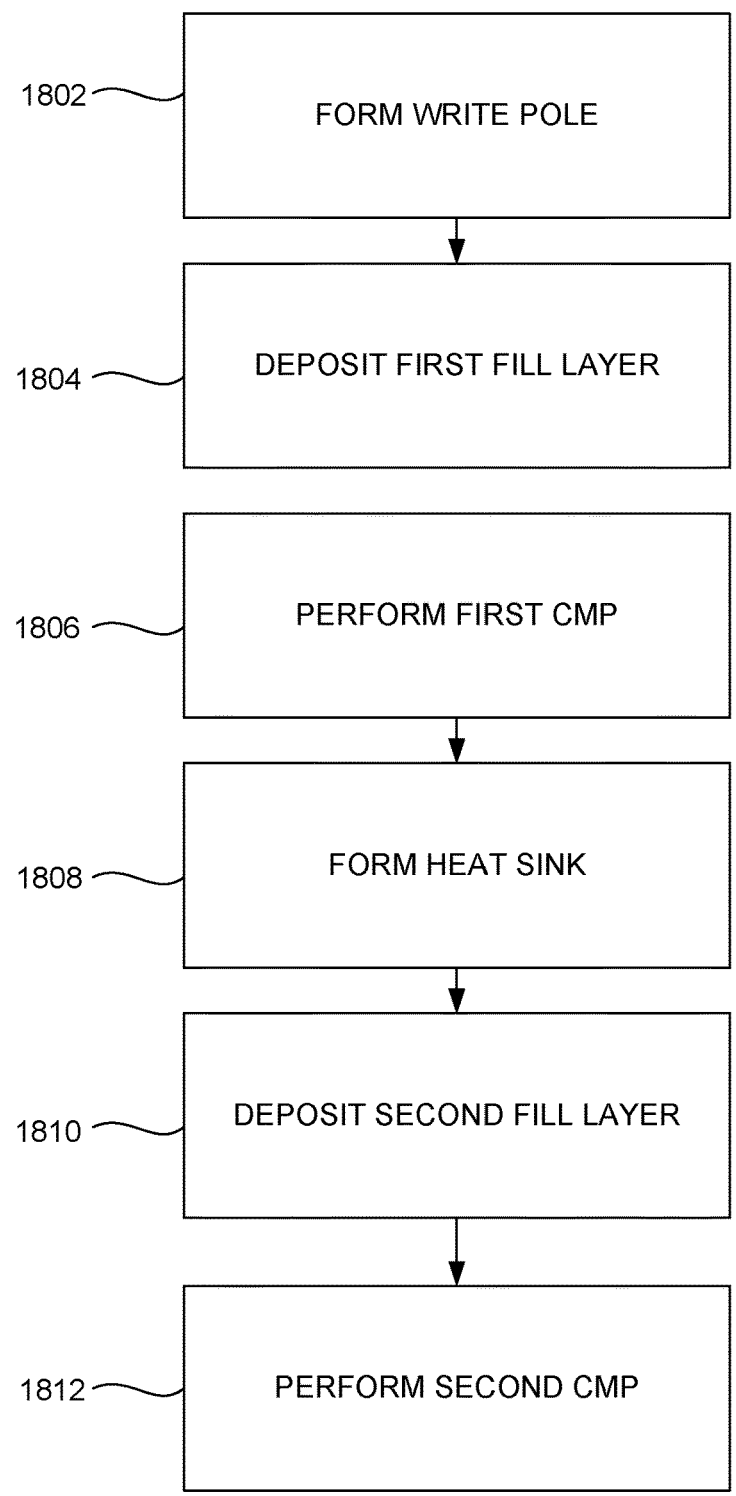
FIG. 18 is a flowchart summarizing a method of manufacturing a magnetic write head according to one embodiment.

The above described process for forming a magnetic write head can be summarized with reference to the flowchart illustrated in FIG. 18, which summarizes the process according to various embodiments. In certain embodiments, certain depicted steps may be omitted, altered or combined, or additional steps may be performed in addition to the ones shown, according to the variations described throughout this disclosure. For example, one or more steps 1804 and 1810 may be omitted in certain embodiments. The process begins with a step 1802 of forming a magnetic write pole. As described above, the write pole can be formed by depositing a magnetic material and masking and etching the magnetic material to form a write pole.

Then, in a step 1804, a first fill layer such as alumina is deposited. Then, in a step 1806 a first chemical mechanical polishing (CMP) is performed. The first CMP is performed sufficiently to reduce the thickness of the write pole to a first or intermediate thickness. Then, in a step 1808 a heat sink is formed. The heat sink can be formed by defining a trench in the first fill layer and electroplating a thermally conductive material such as Cu into the trench. Then, in a step 1810 a second fill layer, such as alumina, is deposited, and in a step 1812 a second chemical mechanical polishing (CMP) is performed. The second CMP is performed to further reduce the thickness of the write pole to a second, thickness that is a final thickness of the write pole.

Figure 19:
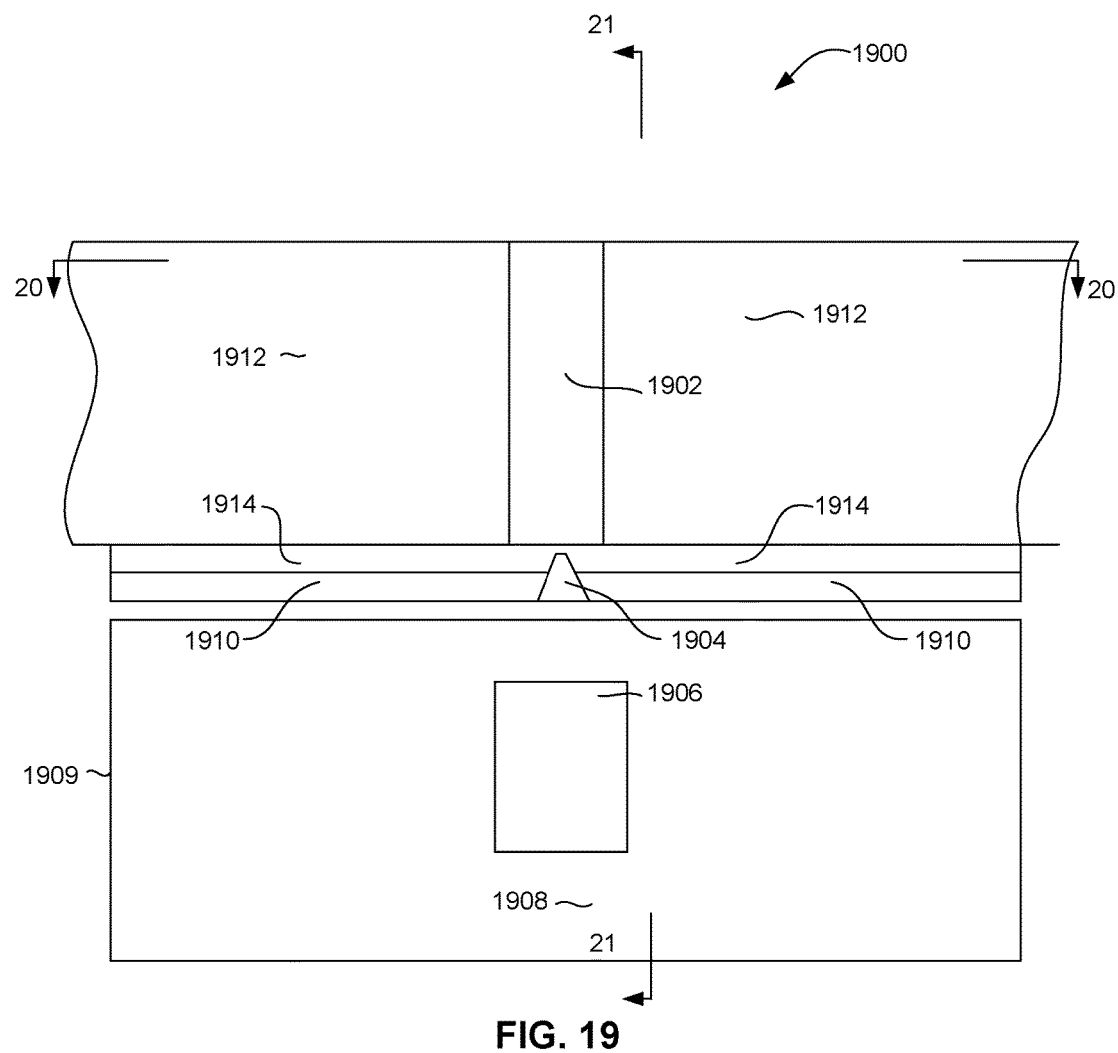
FIG. 19 is view of a magnetic write head structure according to one possible embodiment as seen from a plane parallel with a media facing surface MFS.

Novel Heat Sink Structure:

FIGS. 19 through 22 illustrate a magnetic write head for heat assisted magnetic recording having a novel heat sink structure according to various embodiments. FIG. 19 shows a view of a plane parallel with the media facing surface, but slightly recessed into the media facing surface. FIG. 19 shows a magnetic write head 1900 having a magnetic write pole 1902. A plasmonic antenna, also referred to as a Near-Field Transducer (NFT) 1904 is located adjacent to the write pole 1902 at a leading edge of the write pole 1902.

A waveguide core 1906 and cladding material 1908 together form a waveguide 1909. Light from a laser diode (not shown in FIG. 19) can be conducted through the waveguide 1909 to the near field transducer 1904. The waveguide 1909 can be separated from the near field transducer 1904 by a gap that can be, for example, 10 to 30 nm. The near field transducer 1904 may optionally include wing structures 1910 that extend laterally outward from the main portion of the near field transducer 1904 and which are recessed from the media facing surface.

The near field transducer 1904 focuses light. A surface Plasmon is generated at the surface of the wing 1910 (which is a surface that faces the waveguide 1909), and it propagates toward the media facing surface (not shown in FIG. 19). The propagated surface plasmon generates a localized optical field called an "optical near-field" in the vicinity of the apex of the near field transducer 1904. This optical near-field heats the recording media (not shown in FIG. 19).

Use of the near field transducer 1904 causes heating of the near field transducer 1904 and surrounding structure, including the write pole 1902. In order to reduce this heating of the write pole structure 1902, a heat sink structure 1912 is formed to partially surround the write pole 1902. The heat sink structure 1912 has a novel design that optimizes the transfer of heat from the write pole 1902. As can be seen in FIG. 19, the heat sink structure 1912 extends from and contacts the sides of the write pole structure 1902 in the pole tip region near the media facing surface. The heat sink structure 1912 may also extend over the top (trailing edge) of the write pole structure 1902 in the pole tip region of the write pole structure 1902 near the media facing surface. The heat sink structure 1912 can be constructed of a non-magnetic material having a high thermal conductivity, such as Au, Cu or Ag. The heat sink structure 1912 preferably has a thermal conductivity greater than that of alumina ($Al_2O_3$) and greater than that of silicon oxide, and preferably greater than metals such as iron alloys. In addition, as shown in FIG. 19, a thermal shunt 1914 can be provided beneath the heat sink structure 1912 to help conduct heat from the antenna 1904 to the heat sink structure 1910. The thermal shunt 1914 can be constructed of a material having a high thermal conductivity, such as Au, Ag or Cu, and can be located between and contacting near field transducer 1904 and heat sink structure 1912.

Figure 20:
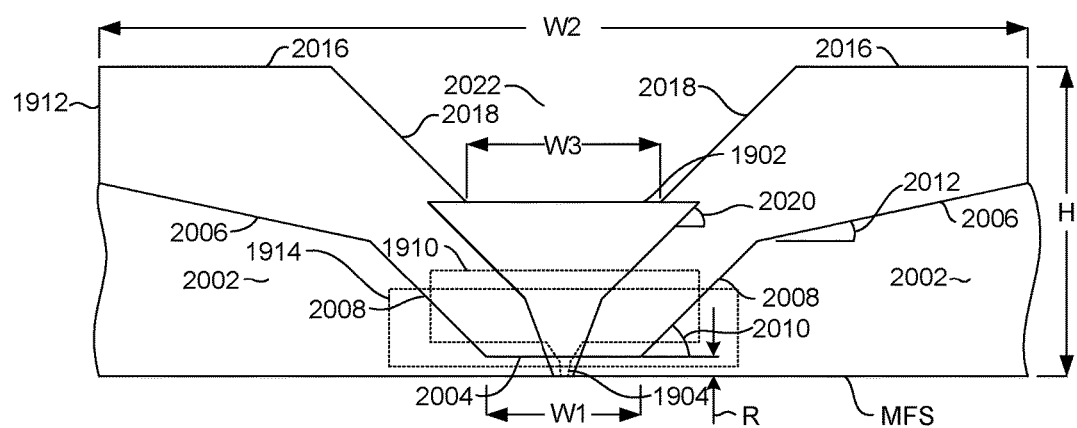
FIG. 20 is a top-down, cross sectional view of a magnetic write head according to an embodiment as seen from line 20-20 of FIG. 19.

The shape of the heat sink structure 1912 can be more clearly understood with reference to FIG. 20, which shows a top-down view as seen from line 20-20 of FIG. 19. In FIG. 20, the location of the media facing surface is indicated by the line denoted as MFS. The magnetic write pole structure 1902 is shown in dashed line in areas where the heat sink structure 1912 passes over the write pole structure 1902. Also, in FIG. 20, the wing structure 1910 and thermal shunt structure 1914 are shown in dotted line, and as understood from FIG. 19, are located beneath the heat sink structure 1912 and write pole 1902.

In order to maximize the thermal efficiency of the heat sink structure 1912 in conducting heat away from the write pole 1902 and antenna 1904 (FIG. 19), it would be desirable to have the heat sink structure 1912 extend all of the way to the media facing surface. However, in order for the heat sink structure 1912 to effectively conduct heat away from the write pole 1902 and antenna 1904 (FIG. 19), the heat sink structure 1912 is constructed of a material that is either physically soft (such as Au) or corrosive (such as Cu or Ag). Therefore, if the heat sink structure 1912 were to extend to the media facing surface MFS, it would be prone to smearing as a result of contact with the magnetic media (not shown) or corrosion due to exposure to atmosphere. Also, if the heat sink structure 1912 were to extend to the media facing surface MFS, diamond particles could become embedded in the heat sink structure 1912 during lapping of the media facing surface MFS, especially if the heat sink structure is constructed of a physically soft material such as Au.

In order to prevent this corrosion, smearing and diamond embedment, the heat sink structure 1912 is recessed from the media facing surface MFS. The space between the heat sink structure 1912 and the media facing surface MFS can be filled with a physically hard, non-corrosive material such as alumina ($Al_2O_3$) 2002. The fill material 2002 can also be a physically hard, non-corrosive metal, such as: Cr, Rh, Ru, Pd, Pt, Ti, Zr, Hf, Ir, W, Pt or oxides of these materials. The use of such hard metals can further improve heat conduction, such as between the heat sink structure 1912 and the thermal shunt 1914.

As can be seen in FIG. 20, the heat sink structure 1912 has a centrally disposed portion 2004 that is closest to the media facing surface MFS. This portion 2004 can be recessed a distance of 50 nm to 400 nm from the media facing surface MFS. This spacing in the centrally disposed region 2004 helps to maximize efficiency of heat transfer at the region of the antenna 1904 (FIG. 19) and write pole 1902, where it is needed most.

However in order to prevent de-lamination of the hard, non-corrosive material 2002, the heat sink structure 1912 sweeps back away from the media facing surface MFS as it extends laterally outward from the centrally disposed portion 2004. This provides a larger physical amount of fill material 2002 in the outer regions to increase physical robustness of the fill layer 2002 in these regions.

In one possible embodiment, the heat sink structure has an outer portion 2006 and an intermediate portion 2008 that is located between the centrally disposed portion 2004 and outer portion 2006. The intermediate portion 2008 can sweep away from the media facing surface MFS at a first angle 2010, and the outer portion can sweep away from the media facing surface MFS at a second angle 2012. The first angle 2010 is preferably a larger angle than the second angel 2012. For example, the first angle 2010 can be about 45 degrees or 20-70 degrees, whereas the second angle 2012 can be about 10 degrees or 5-30 degrees.

Similarly, the heat sink structure 1912 can have a back edge with, an outer portion 2016 and an intermediate portion 2018. The outer portion 2016 can have a back edge that is substantially parallel with the media facing surface MFS, and the intermediate portion 2018 can have a back edge that tapers away from the media facing surface at an angle 2020 relative to a plane that is parallel with the media facing surface. In one possible embodiment, the angle 2020 can be about 45 degrees or 40-50 degrees.

As can be seen in FIG. 20, the heat sink 1912 can be configured with an open space 2022 at its back portion. This opening 2022 helps to prevent the heat sink structure from interfering with an evanescent wave propagating at the interface between the waveguide core 1907 and cladding layer 1908 (FIG. 19), as will be describe further herein below.

For heat transfer purposes, it is desirable for the width W1 of the front edge of the centrally disposed portion 2004 to be as large as possible. However, a larger area with a small recess also promotes de-lamination of the fill layer 2002, which can result in failure of the write head. Therefore, the width W1 of the front edge of the centrally disposed portion 2004 is preferably not too large. In one embodiment, the width W1 of the front edge of the centrally disposed portion 2004 is preferably less than 10 um, and is preferably recessed by a distance R that is 50-400 nm.

In one embodiment, the heat sink structure 1912 can have a total width W2 of greater than 30 um in order to reduce near field transducer temperature. Similarly, the heat sink structure can have a total height H, as measured perpendicular to the media facing surface MFS, of greater than 10 um in order to maintain low near field transducer temperature. Also, in order to maintain low near field transducer temperature, the heat sink structure 1912 can have a thickness measured perpendicular to the page in FIG. 20 that is greater than 20 nm.

As discussed above, it is desirable that the heat sink structure 1912 have a centrally disposed opening 2022 at its back portion opposite the media facing surface MFS in order to avoid interaction between the heat sink structure and an evanescent wave in the wave guide structure (not shown in FIG. 20). To sufficiently prevent such interaction, the opening can 2202 can have a width W3 that is greater than 1 um.

Figure 21:
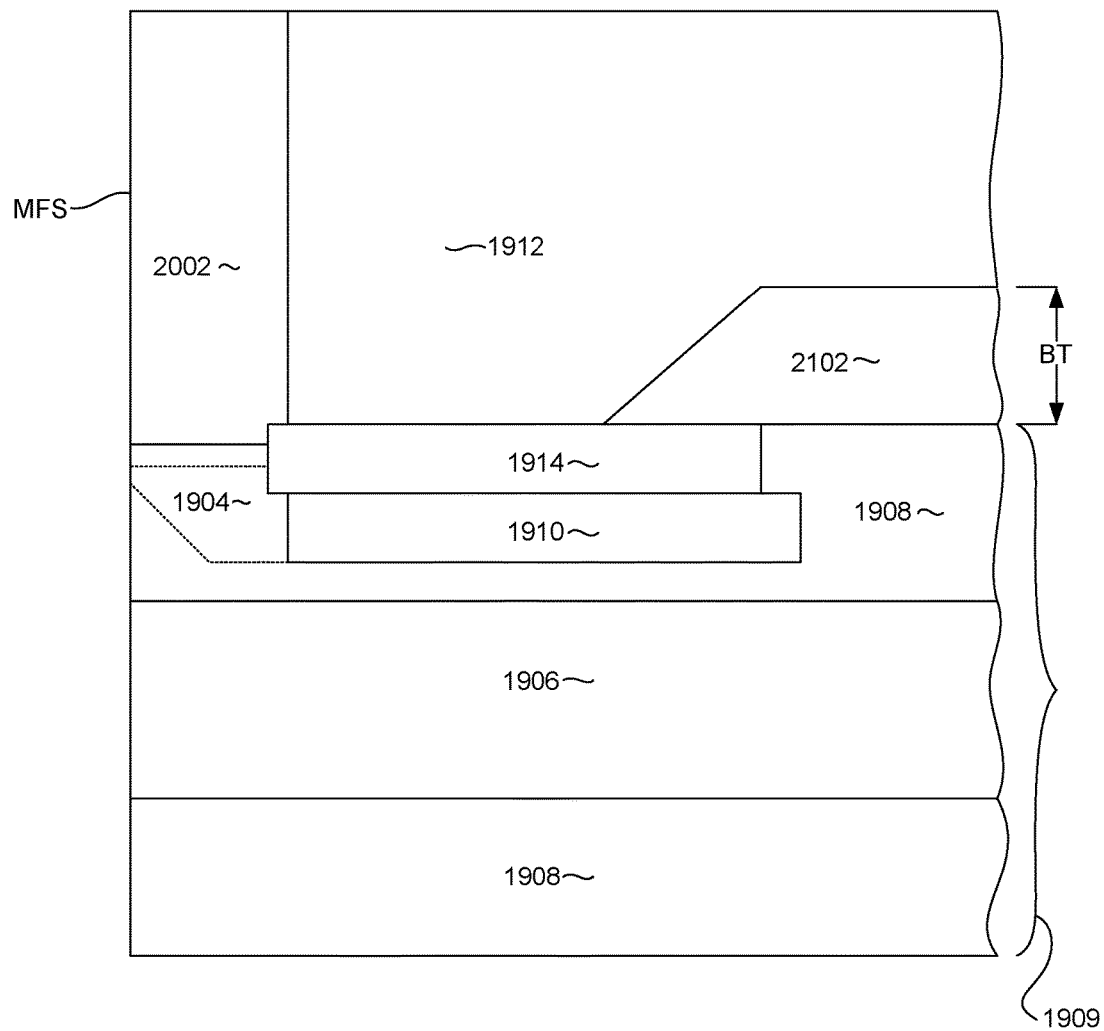
FIG. 21 is a side, cross-sectional view of a magnetic write head according to an embodiment as seen from line 21-21 of FIG. 19.

FIG. 21 shows a side cross sectional view as seen from line 21-21 of FIG. 19. In FIG. 21, the write pole 1902 and near field transducer 1904 are shown in dashed line to indicate that they are behind and hidden by the heat sink structure 1912. The waveguide core 1906 and cladding material 1908 together form the wave guide 1909. The waveguide core 1906 is surrounded by cladding material 1908, which is shown above and below the waveguide core 1906. The waveguide core 1906 can be constructed of a material such as $Ta_2O_5$, or of a material having a refractive index that is higher than a refractive index of the cladding material 1908. The waveguide 1909 can be connected with a light source 228 (FIG. 2), which can be mounted on a backside surface of the slider 113 (FIG. 1).

During operation of heat assisted recording, an evanescent wave propagates at the interface between the waveguide core 1906 and the cladding 1908. If the distance between the heat sink structure 1912 and the waveguide core 1906 is too small, there will be a loss of light propagation as result of interaction between the heat sink 1912 and the evanescent wave. In order to prevent this, a non-metallic spacer material 2102 can be provided between the heat sink 1912 and the cladding material to form a bump at a location that is recessed from the media facing surface. That is, the spacer material 2102 separates the heat sink structure 1912 from the cladding material 1908. The spacer material 2102 preferably does not extend to the media facing surface MFS, but is recessed from the media facing surface MFS by a distance greater than the recess of the centrally disposed portion 2004 (FIG. 20) of the heat sink structure 1912. The spacer material 2102 has a thickness that defines a bump thickness BT as shown in FIG. 21. This bump thickness provides a desired spacing between the cladding 1908 and the heat sink structure 1912. In one embodiment, this bump thickness can be 100-400 nm, which provides sufficient spacing between the cladding 1908 and the heat sink structure 1912.

Figure 22:
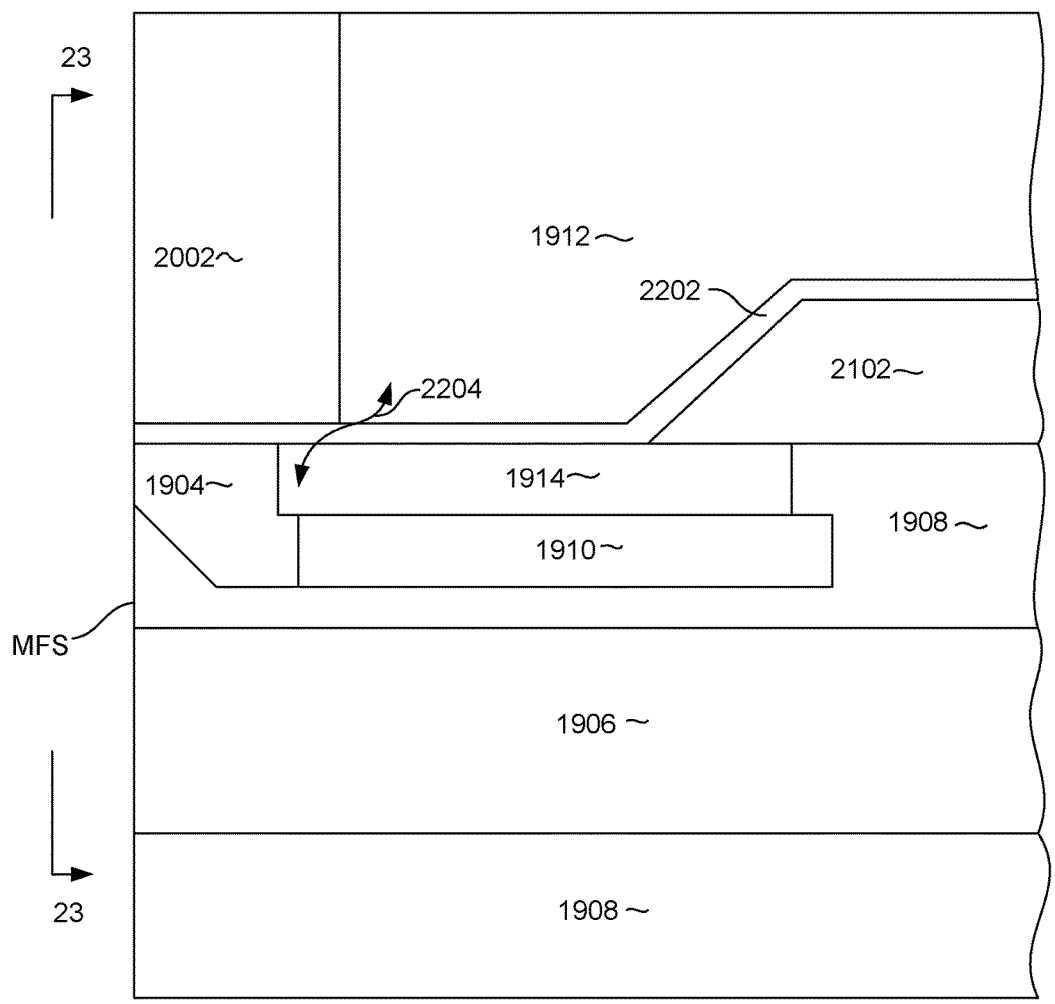
FIG. 22 is a side, cross sectional view similar to that of FIG. 22, illustrating a magnetic write head according to an alternate embodiment.

FIG. 22 shows a side, cross-sectional view of a magnetic write head according to another embodiment. FIG. 22 shows a structure similar to that of FIG. 21. However, the structure of FIG. 22 includes a thin thermally conductive layer 2202 located between the heat sink structure 1912 and the thermal shunt 1914. If the thin thermally conductive layer 2202 is constructed of a material that is not highly corrosive, it can extend all of the way to the media facing surface MFS. For example, the thin thermally conductive layer can be constructed of Cr, Ti, Ta, Au, Rh, Ru, Pd, Pt, Zr, Hf, Ir, W, Pt, as well as oxides or alloys of these materials. The presence of the thin thermally conductive layer 2202 promotes thermal conduction between the heat sink structure 1912 and the thermal shunt 1914 as indicated by arrow 2204. The distance between the thermal shunt structure 1914 and the media facing surface MFS can be 50-100 nm whereas the distance between the heat sink structure 1912 and the media facing surface MFS can be more than 100 nm because of process limitation or variation. This lack of overlap between the thermal heat sink structure 1912 and the thermal shunt structure 1914 reduces conduction between the thermal heat sink and the thermal shunt 1904. By inserting the thin thermally conductive layer 2202, thermal conduction between the heat sink structure 1912 and thermal shunt structure 1914 is increased in the region where they don't overlap, as indicated by arrow 2204.

Because the layer 2202 can be made relatively thin, it can have a small surface area exposed at the surface of the media facing surface MFS. As a result, diamond embedment during lapping is not as much of a problem as would be the case if the heat sink structure 1912 extended to the media facing surface MFS. Therefore, as long as a relatively non-corrosive material such as those discussed above is used for the layer 2202, it can extend all of the way to the media facing surface MFS, thereby maximizing heat transfer from the near field transducer 1904 to the heat sink structure 1912.

Figure 23:
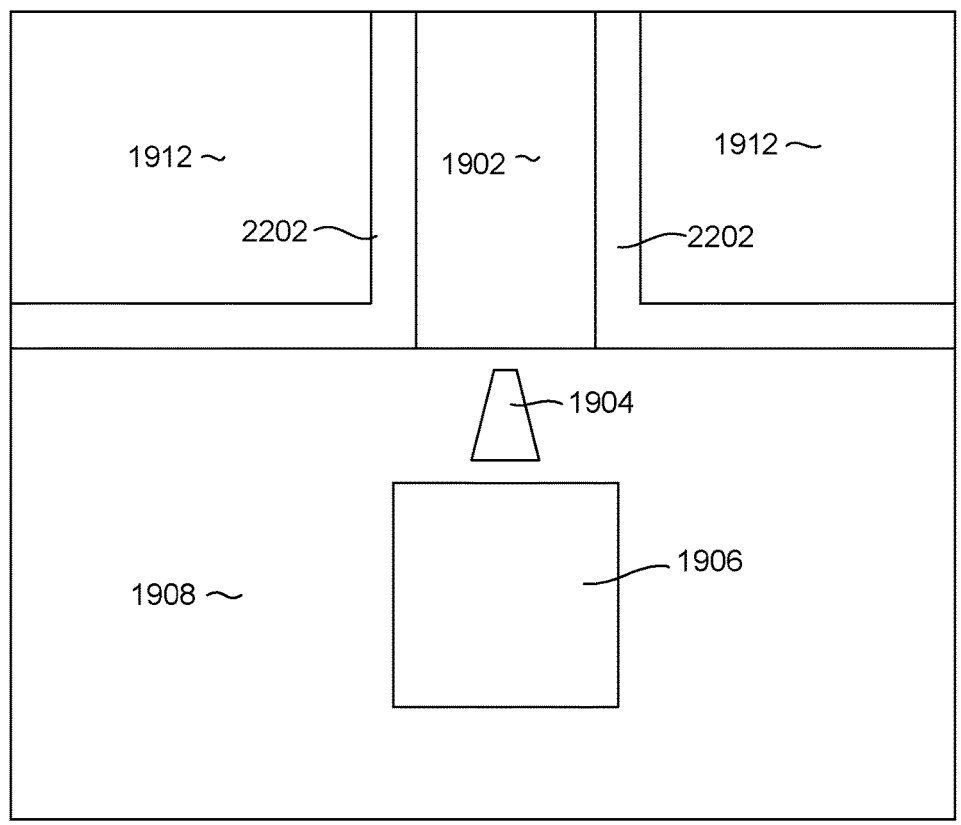
FIG. 23 is a view taken from line 23-23 of FIG. 22.

FIG. 23 shows a view as seen from line 23-23 of FIG. 22. In FIG. 23 it can be seen that the thin, thermally conductive layer 2202 can also extend up the sides of the write pole 1902. This can further increase thermal conduction for improved performance.

While various embodiments have been described above, it should be understood that they have been presented by way of example only and not limitation. Other embodiments falling within the scope of the invention may also become apparent to those skilled in the art. Thus, the breadth and scope of the invention may also become apparent to those skilled in the art. Thus, the breadth and scope of the inventions should not be limited by any of the above-described exemplary embodiments, but should be defined only in accordance with the following claims and their equivalents.

What is claimed is:

1. A magnetic recording head, comprising:
    a magnetic write pole that extends to a media facing surface, the magnetic write pole having first and second laterally opposed sides; and
    a heat sink structure comprising a non-magnetic, thermally conductive material, the heat sink structure being formed adjacent to each of the first and second laterally opposed sides of the magnetic write pole, wherein the heat sink structure has a leading edge surface, a portion of which is formed on a non-metallic spacer structure that is recessed from the media facing surface; and
    a wave guide structure, and wherein the non-metallic spacer structure is located between the heat sink structure and the wave guide structure and causes the leading edge surface of the heat sink structure to step away from the wave guide structure.

2. The magnetic recording head as in claim 1, wherein the heat sink structure has a thermal conductivity greater than that of alumina and greater than that of silicon dioxide.

3. The magnetic recording head as in claim 1, wherein the magnetic write pole has a back edge located opposite a media facing surface and the heat sink structure extends beyond the back edge of the magnetic write pole.

4. The magnetic recording head as in claim 1, wherein the heat sink structure contacts each of the first and second sides of the magnetic write pole and extends laterally outward therefrom.

5. The magnetic recording head as in claim 3, wherein the heat sink structure contacts a portion of the back edge of the magnetic write pole.

6. The magnetic recording head as in claim 1 further comprising a thermal transducer located adjacent to the magnetic write pole.

7. The magnetic recording head as in claim 1, wherein the heat sink structure comprises one or more of Cu, Ag and Au.

8. The magnetic recording head as in claim 1, wherein the heat sink structure is recessed from the media facing surface.

9. The magnetic recording head as in claim 1, wherein the heat sink structure has a central portion that is recessed from the media facing surface and has outer portions that extend away from the media facing surface so as to be further recessed from the media facing surface.

10. The magnetic recording head as in claim 9, wherein the heat sink structure has a back edge opposite the media facing surface that is formed with a centrally disposed opening.

11. The magnetic recording head as in claim 1, wherein the heat sink structure has a centrally disposed portion, an outer portion and an intermediate portion located between the outer portion and the centrally disposed portion;
the centrally disposed portion is recessed from the media facing surface;
the intermediate portion tapers away from the media facing surface at a first angle; and
the outer portion tapers away from the media facing surface at a second angle that is less than the first angle.

12. The magnetic recording head as in claim 11, wherein the first angle is 20-50degrees and the second angle is 5-30degrees.

13. The magnetic recording head as in claim 11, wherein the centrally disposed portion is recessed from the media facing surface by a distance of 50 to 400 nm.

14. The magnetic recording head as in claim 1, wherein the non-metallic spacer structure is recessed from the media facing surface by a distance greater than that by which the heat sink structure is recessed from the media facing surface.

15. A magnetic recording head as in claim 1, the magnetic recording head further comprising:
a near field transducer; and
a thin metallic, thermally conductive layer contacting the leading edge surface of the heat sink structure, at least a portion of the thin metallic, thermally conductive layer being located between the heat sink structure and the near field transducer.

16. A slider for data recording, comprising:
a slider body having a media facing surface, a trailing edge surface and a backside opposite the media facing surface;
a magnetic write head formed on the slider body, the magnetic write head comprising:
a magnetic write pole having first and second laterally opposed sides,
a plasmonic antenna located adjacent to the magnetic write pole, and
a heat sink structure adjacent to each of the first and second laterally opposed sides of the magnetic write pole and extending laterally outward there-from;
a light source formed on the slider body;
a waveguide extending between the light source and the plasmonic antenna; and
a non-metallic spacer located between the heat sink structure and the waveguide, the non-metallic spacer being recessed from the media facing surface.

17. The slider as in claim 16, wherein the heat sink structure is recessed from the media facing surface.

18. The slider as in claim 16, wherein the heat sink structure is recessed from the media facing surface and a space between the heat sink structure and the media facing surface is filled with a non-corrosive material.

19. The slider as in claim 18, wherein the non-corrosive material comprises alumina.

20. The slider as in claim 16, wherein the heat sink structure has a centrally disposed portion that is recessed from the media facing surface by a first distance and has first and second outer portions that are recessed from the media facing surface by a distance that is greater than the first distance.

21. The slider as in claim 16, wherein the heat sink structure comprises one or more of Au, Ag and Cu.

22. The slider as in claim 16, wherein the heat sink structure contacts each of the first and second sides of the magnetic write pole.

23. The slider as in claim 16, wherein the magnetic write pole has a back surface located opposite the media facing surface and wherein the heat sink structure contacts a portion of the back surface.

24. The slider as in claim 16, wherein the non-metallic spacer is recessed from the media facing surface by a distance that is greater than a distance by which the heat sink structure is recessed from the media facing surface.

25. The slider as in claim 18, wherein the non-corrosive material is a metal.

26. The slider as in claim 24, wherein the heat sink structure has a centrally disposed portion that is recessed by a substantially constant distance and has outer portions that taper away from the media facing surface.

27. A magnetic recording head comprising:
a magnetic write pole that extends to a media facing surface;
a non-magnetic heat sink structure partially surrounding the magnetic write pole and having a leading edge surface;
a thermal transducer located adjacent to a leading edge of the magnetic write pole; and
a wave guide structure separated from the heat sink structure by a non-metallic spacer structure that causes the leading edge surface of the heat sink structure to step away from the wave guide structure, wherein the non-metallic spacer structure is recessed from the media facing surface.

28. The magnetic recording head as in claim 27, wherein the leading edge of the magnetic write pole defines a plane and wherein the heat sink structure does not extend beyond the plane.

29. The magnetic recording head as in claim 27, wherein the heat sink structure is recessed from the media facing surface.

* * * * *